(12) United States Patent
Hines

(10) Patent No.: US 6,502,331 B2
(45) Date of Patent: Jan. 7, 2003

(54) ATHLETIC TRAINING SHOE INSERTS AND METHOD OF FABRICATION

(76) Inventor: William J. Hines, 27 Woodland Dr., Vernon, NJ (US) 07462

( * ) Notice: Subject to any disclaimer, the term of this patent is extended or adjusted under 35 U.S.C. 154(b) by 20 days.

(21) Appl. No.: 09/731,162

(22) Filed: Dec. 6, 2000

(65) Prior Publication Data

US 2001/0000835 A1 May 10, 2001

Related U.S. Application Data

(63) Continuation-in-part of application No. 09/289,171, filed on Apr. 9, 1999, now abandoned.

(51) Int. Cl.[7] .............................. A43B 5/00; A43B 13/38
(52) U.S. Cl. ................................ 36/132; 36/43; 482/79
(58) Field of Search .............................. 36/132, 43, 44; 482/79

(56) References Cited

U.S. PATENT DOCUMENTS

| | | | | | |
|---|---|---|---|---|---|
| 3,109,245 A | * | 11/1963 | Glynn | ........................ | 36/114 |
| 3,517,928 A | * | 6/1970 | Shanahan | ..................... | 36/132 |
| 3,573,155 A | * | 3/1971 | Mitchell | ..................... | 36/59 R |
| 3,785,646 A | * | 1/1974 | Ruskin | ........................ | 36/132 |
| 4,252,315 A | * | 2/1981 | Kimura | ........................ | 36/132 |
| 4,686,781 A | * | 8/1987 | Bury | ........................... | 36/11.5 |
| 4,709,921 A | * | 12/1987 | Valuikas et al. | .............. | 36/132 |
| 5,231,776 A | * | 8/1993 | Wagner | ........................... | 36/1 |
| 5,638,613 A | * | 6/1997 | Williams | ..................... | 36/132 |
| 5,758,435 A | * | 6/1998 | Miyata | ........................ | 36/132 |

* cited by examiner

*Primary Examiner*—Ted Kavanaugh
(74) *Attorney, Agent, or Firm*—Parsons & Goltry; Robert A. Parsons; Michael W. Goltry

(57) ABSTRACT

An athletic training shoe insert includes particles of heavy material mixed with a flexible porous material and molded into an insole form to fit within a shoe. The particles and the insole form are designed to allow a human foot to be placed comfortably in the shoe and cooperate to substantially increase the weight of the shoe for training purposes. The amount of particles is changeable to change the weight of the athletic shoe. That is, a larger amount of particles can be added to increase the weight of the shoe. Also, additional insoles of particles and flexible porous material can be added to a shoe to substantially increase the weight if desired.

15 Claims, 3 Drawing Sheets

ATHLETIC TRAINING SHOE INSERTS AND METHOD OF FABRICATION

CROSS-REFERENCE TO RELATED APPLICATIONS

This application is a continuation-in-part of copending application Ser. No. 09/289,171, entitled "Weighted Training Insert For Footwear," filed Apr. 9, 1999 now abandoned.

FIELD OF THE INVENTION

This invention relates to personal training weights.

More particularly, the present invention relates to training weights for use in athletic training.

In a further and more specific aspect, the instant invention concerns the use of shoe inserts as training weights for use in athletic training.

BACKGROUND OF THE INVENTION

In athletic training and the like, it is highly desirable to add additional weight or weights to various parts of the body during the training procedures. These weights operate to increase the amount and function of the muscles so that when the weights are removed the various muscles, which now operate on a much smaller mass, appear to be much larger and more efficient.

In the prior art, weights are hung on the body from virtually any appendage. For example, vests or belts containing weights are used during running and the like. Wrist and ankle bands containing weights are used during virtually all exercises. Also, weights, similar to small dumbbells, may be carried during exercises such as running and the like. Unfortunately, these weights are not convenient and in many instances may be simply ignored. Also, it is difficult to provide weights that are convenient for all classes of people (i.e. ladies, men, young boys and girls, etc.). In many instances the weights are too large, too small, improperly placed so as not to provide the ultimate good, etc.

It would be highly advantageous, therefore, to remedy the foregoing and other deficiencies inherent in the prior art.

Accordingly, it is an object of the present invention to provide new and improved shoe inserts as training weights for use in athletic training and methods of fabrication.

Another object of the invention is to provide shoe inserts as training weights that are easily accommodated to virtually any class of person.

Another object of the invention is to provide a method of fabricating shoe inserts which is easily performed and highly adjustable to accommodate shoe inserts as training weights to virtually any class of person.

And another object of the invention is to provide shoe inserts as training weights that are more easily placed in the most strategic positions for exercising.

Still another object of the present invention is to provide shoe inserts as training weights that are easily adaptable to a variety of exercises and different people.

Yet another object of the invention is to provide shoe inserts as training weights that are easily inserted in standard athletic shoes, such as tennis shoes, track shoes, running shoes, etc. so as to be highly convenient and which are completely adjustable in weight and position so as to be usable by virtually any person desiring to exercise.

SUMMARY OF THE INVENTION

Briefly, to achieve the desired objects of the instant invention in accordance with a preferred embodiment thereof, provided is an athletic training shoe insert including particles of weighted material and an insert form constructed to fit within the athletic shoe and to receive the particles of weighted material and hold the particles of weighted material in a fixed position within the athletic shoe. The particles of weighted material and the insert form are designed to allow a human foot to be placed comfortably in the athletic shoe and to cooperate to substantially increase the weight of the athletic shoe for training purposes.

The desired objects of the instant invention are further achieved in accordance with a preferred method of fabricating an athletic training shoe insert including the steps of providing particles of weighted material, providing flexible porous material, and molding the particles of weighted material and flexible porous material into a flexible porous insert form designed to fit within an athletic shoe in a fixed position, the flexible porous insert form being designed to mold to a human foot and to substantially increase the weight of the athletic shoe for training purposes.

The desired objects of the instant invention are also achieved in accordance with a further and preferred embodiment of a method of fabricating an athletic training shoe insert including the steps of providing particles of weighted material, providing fluid (e.g., liquid, powdered, granular, etc.) flexible porous material, mixing the particles of weighted material and the fluid flexible porous material, and molding the mixed particles of weighted material and fluid flexible porous material into a flexible porous insert form designed to fit within an athletic shoe in a fixed position with the particles of weighted material dispersed throughout the flexible porous insert form, the flexible porous insert form being designed to mold to a human foot and to substantially increase the weight of the athletic shoe for training purposes.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
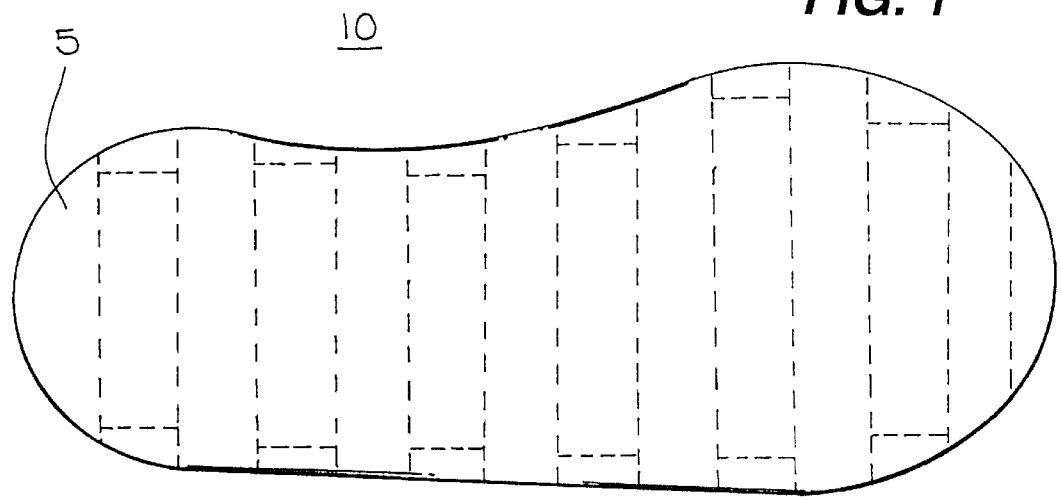
FIG. 1 is a view in top plan of an athletic training shoe insert in accordance with the present invention.
Figure 2:
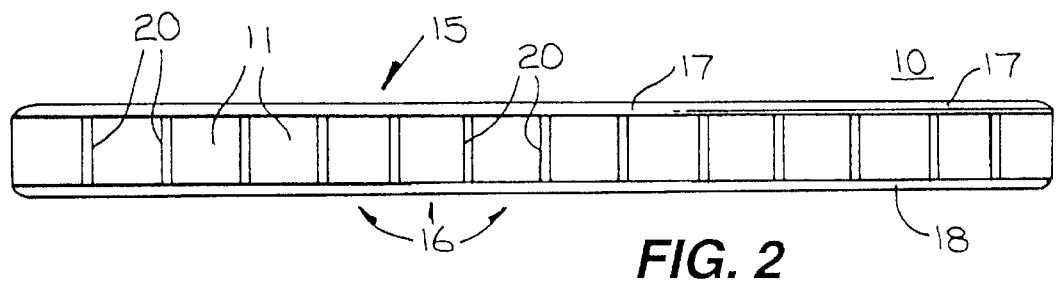
FIG. 2 is a view in side elevation of the athletic training shoe insert of FIG. 1.

Turning now to the drawings in which like reference characters indicate corresponding elements throughout the several views, attention is first directed to FIGS. 1 and 2 which illustrates an athletic training shoe insert 10 in accordance with the present invention. Insert 10 has associated therewith weighted material, which in this specific embodiment includes a plurality of metal strips 11 illustrated generally by broken lines in FIG. 1 and can be seen from one end in the side elevational view of FIG. 2. The weighted material may be any convenient material, such as one or more pieces or strips of heavy material (e.g. total or partial lead; smaller particles, such as rectangles, spheres, granules, etc., of heavy material, like metals, minerals (sand) or even liquid-filled chambers, embedded in plastic; or the like, etc.). In this embodiment metal strips 11 are a plurality of thin lead strips constructed to be positioned transversely within an athletic shoe and to extend in parallel spaced apart relationship substantially the length of the athletic shoe. Here it should be understood that each strip could be a solid piece of material or it could be made up of a plurality of pieces, such as squares, to provide easy shaping to the foot in a transverse direction.

Insert 10 further includes an insert form 15 constructed to fit within the athletic shoe and to receive metal strips 11 therein and hold metal strips 11 in a fixed position within the athletic shoe. While insert form 15 can be constructed in any of a variety of configurations which will hold the weighted material in a fixed position within the athletic shoe, in this embodiment and for simplicity insert 15 is constructed in the shape of an insole for the athletic training shoe. Also, in this embodiment, insert form 15 is constructed of a soft padding material, similar to a standard insole and has pockets 16 formed between an upper piece 17 of padding material and a lower piece 18 of stiffer material (e.g. leather, plastic, or the like. A plurality of partitions 20 are formed, one between each adjacent pair of metal strips 11, to complete pockets 16. Generally, partitions 20 may be formed by simply sewing transversely across insert form 15 to sew upper and lower pieces 17 and 18 together along each partition 20. Also, one or both ends of each pocket 16 may be sewn shut. In a preferred embodiment one end of each pocket is closed and one end is open (see specifically FIG. 2) to facilitate inserting and removing metal strips 11 so that the overall weight of insert 10 can be easily changed and the position of metal strips 11 can be easily changed.

Figure 3:
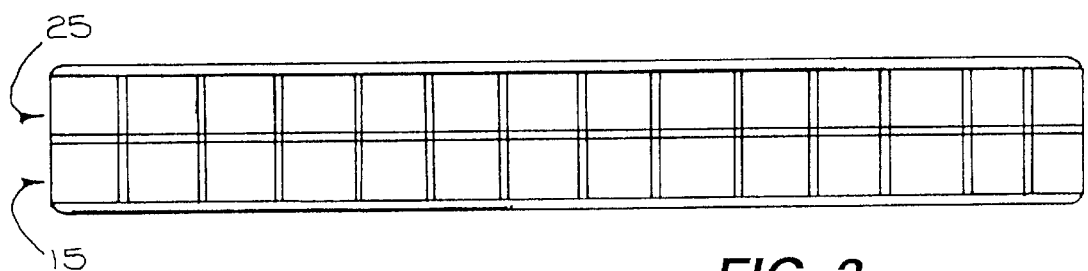
FIG. 3 is a view in side elevation of two of the athletic training shoe inserts of FIG. 1 placed on top of each other.

In a typical example, a person might include only a few metal strips 11 positioned in pockets 16 adjacent the front of insert form 15 when first beginning training. As the person's muscles begin to build-up or improve, more metal strips 11 can be added in pockets 16 until all of pockets 16 in insert form 15 are full. At this time if additional weight is desired, a second athletic training shoe insert 25, similar to athletic training shoe insert 10 can be added (see FIG. 3). Weighted material can again be gradually added to second insert 25 until it is full and then additional athletic training shoe inserts can be added. In one embodiment, metal strips 11 are formed of a thin relatively soft lead which substantially molds to the foot during use so that a human foot can be placed comfortably in the athletic shoe, even when two or more athletic training shoe inserts are used. Metal strips 11 could also be formed of a plurality of pieces, such as squares, to provide easy shaping in a transverse direction, especially if the metal is not sufficiently malleable to be easily formed by simply using insert 10. Also, by placing metal strips 11 in spaced apart relationship along the length of insert form 15 (the length of the athletic shoe), the athletic shoe is free to flex in a normal fashion as it is used.

Figure 4:
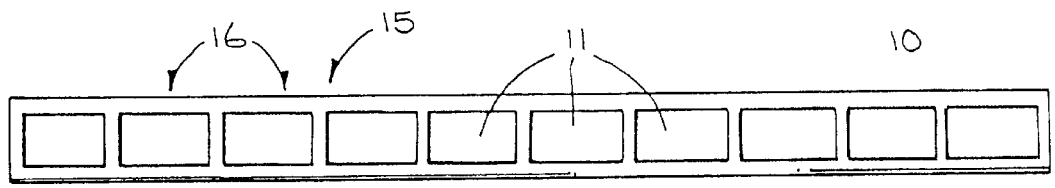
FIG. 4 is a view in side elevation of another embodiment of an athletic training shoe insert in accordance with the present invention.

Turning now to FIG. 4, a second embodiment of an athletic training shoe insert, designated 10', is illustrated. In this embodiment similar components are designated with similar numbers having a prime added to indicate the different embodiment. In this embodiment, metal strips 11' are used which are similar in size, shape, and material to metal strips 11 described above. An insert form 15' includes a flexible porous material, such as foam injection, molded rubber, gel coating, molded porous plastic, etc., which at least partially encircles the metal strip. Generally, insert form 15' is formed by simply molding metal strips 11' directly into it. However, insert form 15' can be molded to include pockets 16' and metal strips 11' can then be slipped into or out of pockets 16', as desired.

Figure 5:
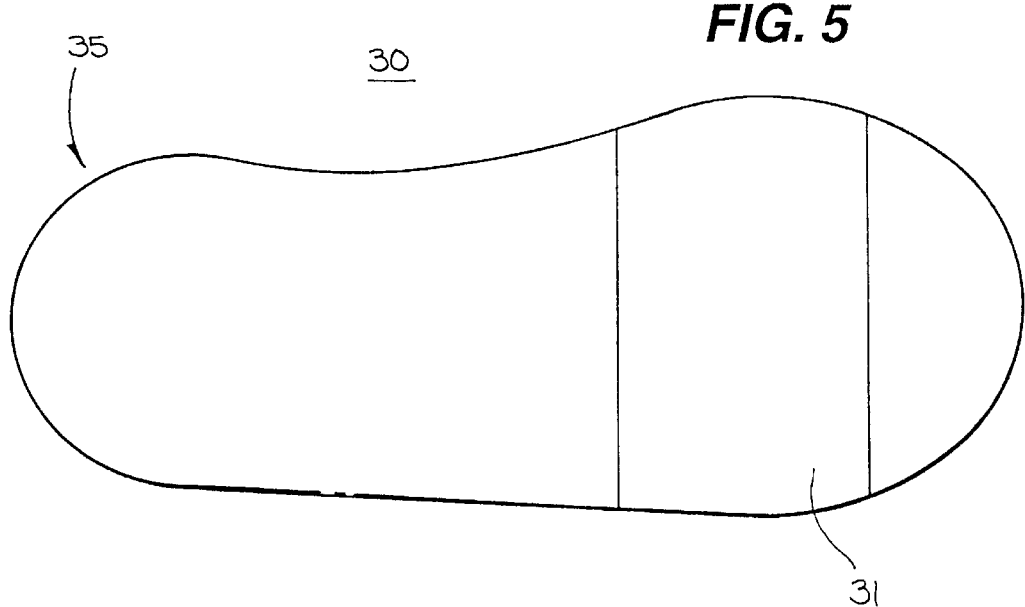
FIG. 5 is a view in top plan of another embodiment of an athletic training shoe insert in accordance with the present invention.
Figure 6:
FIG. 6 is a view in side elevation of the athletic training shoe insert of FIG. 5.

Turning now to FIGS. 5 and 6, another embodiment is illustrated of an athletic training shoe insert 30 in accordance with the present invention. Insert 30 includes a single piece 31 of weighted material constructed to fit within an athletic shoe. An insert form 35 is constructed to fit within the athletic shoe and to receive single piece 31 of the weighted material and hold single piece 31 in a fixed position within the athletic shoe. Again, insert form 35 is illustrated in the form of a normal insole but as described previously any of a variety of shapes might be utilized as long as it performs the function of holding single piece 31 of weighted material in a fixed position. Also, single piece 31 may be affixed to insert form 35 in a variety of means, including but not limited to a pocket (generally as described above), molding into insert form 35, sewing, riveting, etc.

Thus, single piece 31 of weighted material and insert form 35 are designed to be placed in an athletic shoe and to allow a human foot to be placed comfortably in the athletic shoe. Single piece 31 of weighted material and insert form 35 are further designed to cooperate to substantially increase the weight of the athletic shoe for training purposes.

Figure 7:
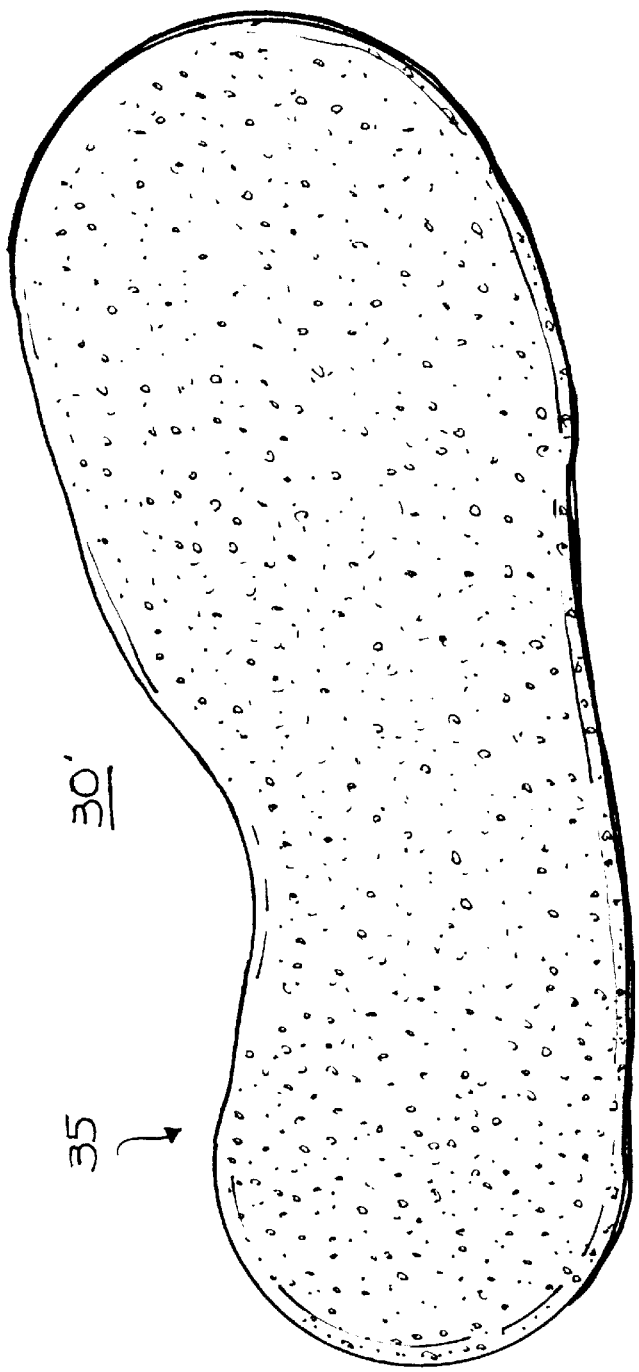
FIG. 7 is a view in top plan of another embodiment of an athletic shoe insert in accordance with the present invention.
Figure 8:
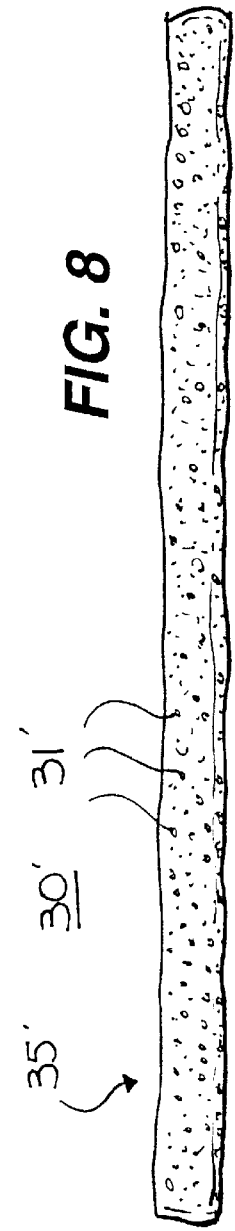
FIG. 8 is a view in side elevation of the athletic training shoe insert of FIG. 7.

Turning now to FIGS. 7 and 8, a preferred embodiment is illustrated of an athletic training shoe insert 30' in accordance with the present invention. Insert 30' includes flexible porous material, such as foam injection, molded rubber, gel coating, molded porous plastic, molded elastomeric material etc., and intermixed particles 31' of weighted material formed to fit within an athletic shoe. Particles 31' of weighted material may be any convenient material with sufficient weight to provide the desired results and with substantially any size and shape. In this preferred embodiment, the flexible porous material is a soft plastic or elastomeric material in a fluid form, including liquid, powdered, or granular form, and particles 31' are particles of a compound or derivative including, for example, iron (e.g., powdered carbonyl iron). The fluid material and particles 31' are intermixed and molded to form athletic training shoe insert 30'. Here it will be understood that the ratio of particles 31' to the fluid material will depend upon the ultimate desired weight and the maximum ratio is determined only by the amount of flexible porous material needed to provide an insert form 35' that will be firmly held together. Insert form 35' is molded to fit comfortably within the athletic shoe and to hold particles 31' in a fixed position within the athletic shoe. Again, insert form 35' is illustrated in the form of a normal insole but as described previously any of a variety of shapes might be utilized as long as it performs the function of holding particles 31' of weighted material in a fixed position.

Accordingly, new and improved shoe inserts as training weights for use in athletic training are disclosed which include at least one piece of weighted material constructed to fit within an athletic shoe and an insert form constructed to fit within the athletic shoe and to receive the weighted material and hold the weighted material in a fixed position within the athletic shoe. In a preferred embodiment, the weighted material is a compound or derivative including, for example, iron which is intermixed with a fluid flexible porous material and molded so as to fit within an athletic shoe. The weighted material and the insert form are designed to allow a human foot to be placed comfortably in the athletic shoe and to cooperate to substantially increase the weight of the athletic shoe for training purposes. Further, the inserts mold to the foot during use to increase the comfort.

Because the shoe inserts are easily placed in and removed from the athletic shoes they are always convenient and are placed at the most strategic position to achieve the most valuable exercise. Further, because the position and number of pieces or amount of particles of weighted material are changeable or adjustable, the shoe inserts are easily accommodated to virtually any class of person and are more easily placed in the most strategic positions (i.e. adjacent the toes or adjacent the heel) for exercising. Also, the shoe inserts as training weights are easily inserted in standard athletic shoes, such as tennis shoes, track shoes, running shoes. etc. so as to be highly convenient and are completely adjustable in weight and position so as to be usable by virtually any person desiring to exercise.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. An athletic training shoe insert comprising:

particles of carbonyl iron;

a flexible porous insert form constructed to fit within the athletic shoe and to receive the particles of carbonyl iron and hold the particles of carbonyl iron in a fixed position within the athletic shoe; and the particles of carbonyl iron and the insert form being designed to allow a human foot to be placed comfortably in the athletic shoe and to cooperate to substantially increase the weight of the athletic shoe for training purposes.

2. An athletic training shoe insert as claimed in claim 1 wherein the flexible porous insert form is molded from fluid flexible porous material.

3. An athletic training shoe insert as claimed in claim 2 wherein the fluid flexible porous material and the particles of carbonyl iron are intermixed and molded into the insert form.

4. An athletic training shoe insert as claimed in claim 3 wherein the athletic shoe has a length and a width and the insert form is designed to extend substantially the length and width of the athletic shoe and the particles of carbonyl iron are dispersed along the length and width of the athletic shoe.

5. An athletic training shoe insert as claimed in claim 1 wherein the insert form is constructed in the shape of an insole for the athletic training shoe.

6. An athletic training shoe insert comprising:

particles of carbonyl iron;

flexible porous material;

a flexible porous insert form including the particles of carbonyl iron and the flexible porous material intermixed and molded so as to fit within an athletic shoe in a fixed position with the particles of carbonyl iron dispersed throughout the flexible porous insert form; and the flexible porous insert form being designed to mold to a human foot and to substantially increase the weight of the athletic shoe for training purposes.

7. An athletic training shoe insert as claimed in claim 6 wherein the flexible porous material includes one of foam injection, molded rubber, molded porous plastic, and gel coating.

8. An athletic training shoe insert as claimed in claim 6 wherein the particles of carbonyl iron are dispersed along the insert form sufficiently to allow normal flexing of the athletic shoe.

9. A method of fabricating an athletic training shoe insert comprising the steps of:

providing particles of carbonyl iron;

providing flexible porous material; and molding the particles of carbonyl iron and flexible porous material into a flexible porous insert form designed to fit within an athletic shoe in a fixed position, the flexible porous insert form being designed to mold to a human foot and to substantially increase the weight of the athletic shoe for training purposes.

10. A method as claimed in claim 9 wherein the step of providing the particles of carbonyl iron includes changing the amount of particles of weighted material to change the weight of the athletic shoe.

11. A method as claimed in claim 9 wherein the step of providing the flexible porous material includes providing one of foam injection, molded rubber, molded porous plastic, and gel coating.

12. A method as claimed in claim 9 wherein the step of molding includes molding the insert form in the shape of an insole for the athletic training shoe.

13. A method as claimed in claim 9 wherein the step of providing flexible porous material includes providing fluid flexible porous material.

14. A method as claimed in claim 13 including in addition a step of mixing the particles of carbonyl iron and the fluid flexible porous material prior to the molding step.

15. A method as claimed in claim 14 wherein the mixing and molding steps are performed to form a flexible porous insert form with the particles of carbonyl iron dispersed throughout the flexible porous insert form, the flexible porous inset form being designed to mold to a human foot and to substantially increase the weight of the athletic shoe for training purposes.

* * * * *